United States Patent
Blodgett et al.

(10) Patent No.: US 7,305,817 B2
(45) Date of Patent: Dec. 11, 2007

(54) SINUOUS CHEVRON EXHAUST NOZZLE

(75) Inventors: Keith Edward James Blodgett, Milford, OH (US); Kevin Sean Early, Oregonia, OH (US); Steven Martens, Ballston Lake, NY (US); William Andrew Bailey, Cincinnati, OH (US); Kenneth Daniel Price, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 10/774,963

(22) Filed: Feb. 9, 2004

(65) Prior Publication Data

US 2005/0172611 A1   Aug. 11, 2005

(51) Int. Cl.
  *F02K 1/38* (2006.01)
(52) U.S. Cl. .................. 60/262; 60/226.1
(58) Field of Classification Search .......... 60/226.1, 60/770, 262
  See application file for complete search history.

(56) References Cited

U.S. PATENT DOCUMENTS

| | | | |
|---|---|---|---|
| 3,153,319 A | 10/1964 | Young | |
| 4,089,618 A | 5/1978 | Patel | |
| 4,318,669 A | 3/1982 | Wennerstrom | |
| 4,754,924 A | 7/1988 | Shannon | |
| 4,830,315 A * | 5/1989 | Presz et al. | 244/200 |
| 6,082,635 A | 7/2000 | Seiner et al. | |
| 6,314,721 B1 | 11/2001 | Mathews et al. | |
| 6,360,528 B1 * | 3/2002 | Brausch et al. | 60/262 |
| 6,487,848 B2 * | 12/2002 | Zysman et al. | 60/262 |
| 6,502,383 B1 | 1/2003 | Janardan et al. | |
| 6,505,706 B2 | 1/2003 | Tse | |
| 6,532,729 B2 * | 3/2003 | Martens | 60/204 |
| 6,612,106 B2 * | 9/2003 | Balzer | 60/204 |
| 6,658,839 B2 * | 12/2003 | Hebert | 60/204 |
| 6,718,752 B2 * | 4/2004 | Nesbitt et al. | 60/204 |
| 6,733,240 B2 | 5/2004 | Gliebe | |
| 6,786,037 B2 * | 9/2004 | Balzer | 60/204 |
| 6,813,877 B2 | 11/2004 | Birch et al. | |
| 6,826,901 B2 * | 12/2004 | Hebert | 60/204 |
| 6,935,098 B2 * | 8/2005 | Bardagi et al. | 60/262 |
| 7,000,378 B2 * | 2/2006 | Birch et al. | 60/226.1 |
| 7,065,957 B2 * | 6/2006 | Balzer | 60/204 |
| 7,085,388 B2 | 8/2006 | Butler et al. | |
| 7,093,423 B2 * | 8/2006 | Gowda et al. | 60/204 |
| 7,174,704 B2 * | 2/2007 | Renggli | 60/204 |
| 7,216,831 B2 * | 5/2007 | Wood | 244/99.8 |

(Continued)

FOREIGN PATENT DOCUMENTS

EP   0984152 B1   3/2000

(Continued)

*Primary Examiner*—William H. Rodriguez
(74) *Attorney, Agent, or Firm*—William S. Andes; Francis L. Conte

(57) ABSTRACT

A gas turbine engine exhaust nozzle includes a row of laterally sinuous chevrons extending from an aft end of an exhaust duct. The chevrons have radially outer and inner surfaces bound by a laterally sinuous trailing edge extending between a base of the chevrons adjoining the duct and an axially opposite apex of the chevrons. Each chevron has a compound arcuate contour both axially and laterally, and the sinuous trailing edge of the chevrons further compounds the arcuate configuration of each chevron.

26 Claims, 3 Drawing Sheets

U.S. PATENT DOCUMENTS

| | | | |
|---|---|---|---|
| 2001/0035004 A1* | 11/2001 | Balzer | 60/204 |
| 2002/0164249 A1 | 11/2002 | Strange et al. | |
| 2002/0178711 A1* | 12/2002 | Martens | 60/226.1 |
| 2003/0213227 A1 | 11/2003 | Balzer | |
| 2004/0244357 A1 | 12/2004 | Sloan | |
| 2004/0262447 A1 | 12/2004 | Grazlosl et al. | |
| 2005/0193716 A1* | 9/2005 | Schlinker et al. | 60/226.1 |
| 2005/0214107 A1* | 9/2005 | Gutmark et al. | 415/1 |
| 2006/0053769 A1 | 3/2006 | Feuillard et al. | |
| 2006/0059891 A1 | 3/2006 | Sheoran et al. | |
| 2006/0101803 A1 | 5/2006 | White | |
| 2006/0101807 A1* | 5/2006 | Wood et al. | 60/262 |
| 2007/0000228 A1* | 1/2007 | Ohri et al. | 60/39.37 |
| 2007/0033922 A1* | 2/2007 | Reba et al. | 60/262 |

FOREIGN PATENT DOCUMENTS

| | | |
|---|---|---|
| EP | 1340901 A2 | 9/2003 |
| GB | 2146702 | 4/1985 |
| GB | 2289921 | 12/1995 |

* cited by examiner

SINUOUS CHEVRON EXHAUST NOZZLE

BACKGROUND OF THE INVENTION

The present invention relates generally to gas turbine engines, and, more specifically, to reduction of exhaust noise.

A typical gas turbine engine includes a compressor for pressurizing air which is mixed with fuel and ignited in a combustor for generating hot combustion gases which flow through one or more stages of turbines that power the compressor in a core engine configuration. Typically cooperating with the core engine is a low pressure compressor, such as a fan, disposed upstream of the high pressure compressor of the core engine, which is powered by a low pressure turbine disposed downstream from the high pressure turbine of the core engine.

In a typical turbofan aircraft gas turbine engine application for powering an aircraft in flight, a core exhaust nozzle is used for independently discharging the core exhaust gases inside a concentric fan exhaust nozzle which discharges the fan air therefrom for producing thrust. The separate exhausts from the core nozzle and the fan nozzle are high velocity jets typically having maximum velocity during take-off operation of the aircraft with the engine operated under relatively high power. The high velocity jets interact with each other as well as with the ambient air and produce substantial noise along the take-off path of the aircraft.

U.S. Pat. No. 6,360,528, assigned to the present assignee, discloses an improved exhaust nozzle including a row of chevrons which promote mixing of exhaust flow for noise attenuation. The chevrons are triangular and extend from an aft end of an exhaust duct and define complementary diverging slots circumferentially or laterally therebetween. The chevrons are integral extensions of the exhaust duct, and are preferably coextensive with the outer and inner surfaces thereof.

In a typical annular exhaust duct, the inner surface thereof is circumferentially concave, and the inner surfaces of the row of chevrons are correspondingly circumferentially concave. However, by introducing an axially concave component of curvature in the radially inner surfaces of the chevrons, each chevron may therefore have a compound shallow bowl therein for enhancing performance.

These shallow bowl triangular chevrons have been built, tested, and are found in commercially available engines for powering aircraft in flight. In a typical turbofan engine application, the chevron exhaust nozzle replaces the otherwise simple annular core exhaust nozzle and effects substantial noise attenuation as the core exhaust gases mix with the fan exhaust flow channeled thereover during operation.

However, noise attenuation comes with a corresponding price. In particular, the chevron exhaust nozzle introduces additional pressure losses in the exhaust flows being mixed thereby which decreases the overall efficiency or performance of the engine. In an aircraft engine application, more fuel is required to power the aircraft than would be otherwise required with a conventional circumferentially continuous exhaust nozzle having a plain circular outlet.

Accordingly, it is desired to provide a chevron exhaust nozzle having improved performance for reducing fuel consumption during operation.

BRIEF DESCRIPTION OF THE INVENTION

A gas turbine engine exhaust nozzle includes a row of laterally sinuous chevrons extending from an aft end of an exhaust duct. The chevrons have radially outer and inner surfaces bound by a laterally sinuous trailing edge extending between a base of the chevrons adjoining the duct and an axially opposite apex of the chevrons. Each chevron has a compound arcuate contour both axially and laterally, and the sinuous trailing edge of the chevrons further compounds the arcuate configuration of each chevron.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
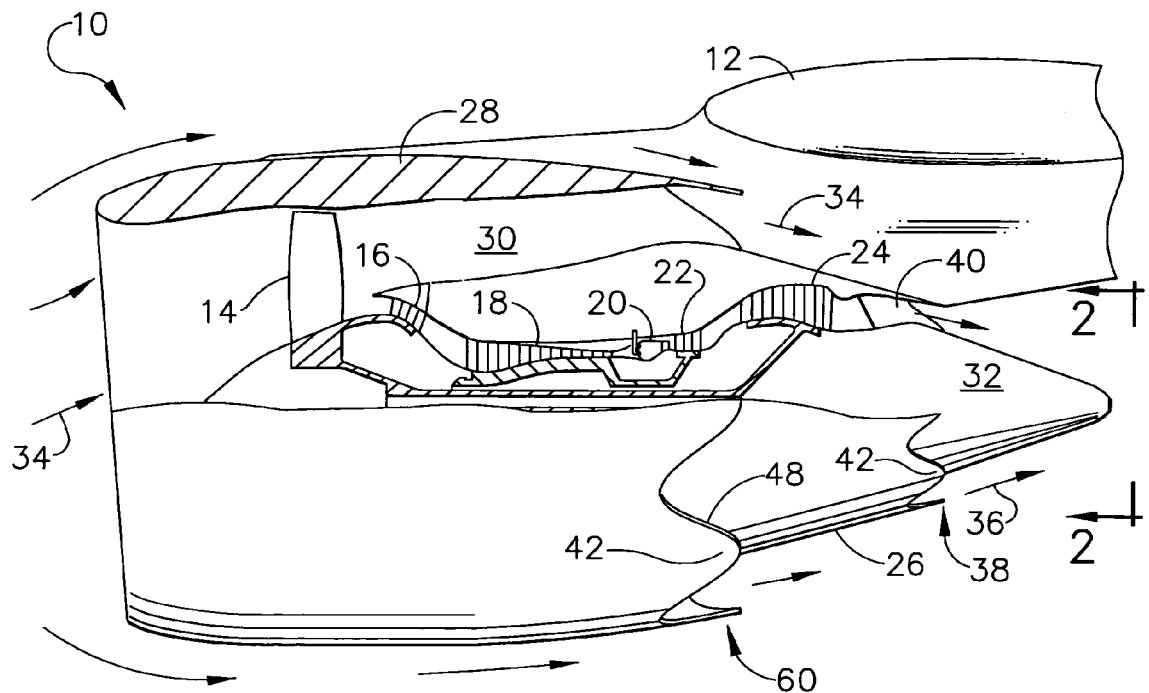
FIG. 1 is an axial side view, partly in section, of an exemplary aircraft turbofan gas turbine engine including fan and core exhaust nozzles having compound contour chevrons therein.

FIG. 1 illustrates an aircraft turbofan gas turbine engine 10 suitably joined to a wing of an aircraft 12 illustrated in part. The engine includes in serial flow communication a fan 14, low pressure compressor 16, high pressure compressor 18, combustor 20, high pressure turbine (HPT) 22, and low pressure turbine (LPT) 24 operatively joined together in a conventional configuration.

The engine also includes a core nacelle or cowl 26 surrounding the core engine and LPT, and a fan nacelle or cowl 28 surrounding the fan and the forward part of the core cowl and spaced radially outwardly therefrom to define a bypass duct 30. A conventional centerbody or plug 32 extends aft from the LPT and is spaced radially inwardly from the aft end of the core cowl.

During operation, ambient air 34 flows into the fan 14 as well as around the fan cowl. The air is pressurized by the fan and discharged through the fan duct as fan exhaust for producing thrust. A portion of the air channeled past the fan is compressed in the core engine and suitably mixed with fuel and ignited for generating hot combustion gases 36 which are discharged from the core engine as core exhaust.

More specifically, the core engine includes a core exhaust nozzle 38 at the aft end thereof which surrounds the center plug 32 for discharging the core exhaust gases. The core nozzle 38 is axisymmetric about the axial centerline axis of the engine in the exemplary embodiment illustrated in FIG. 2.

Figure 3:
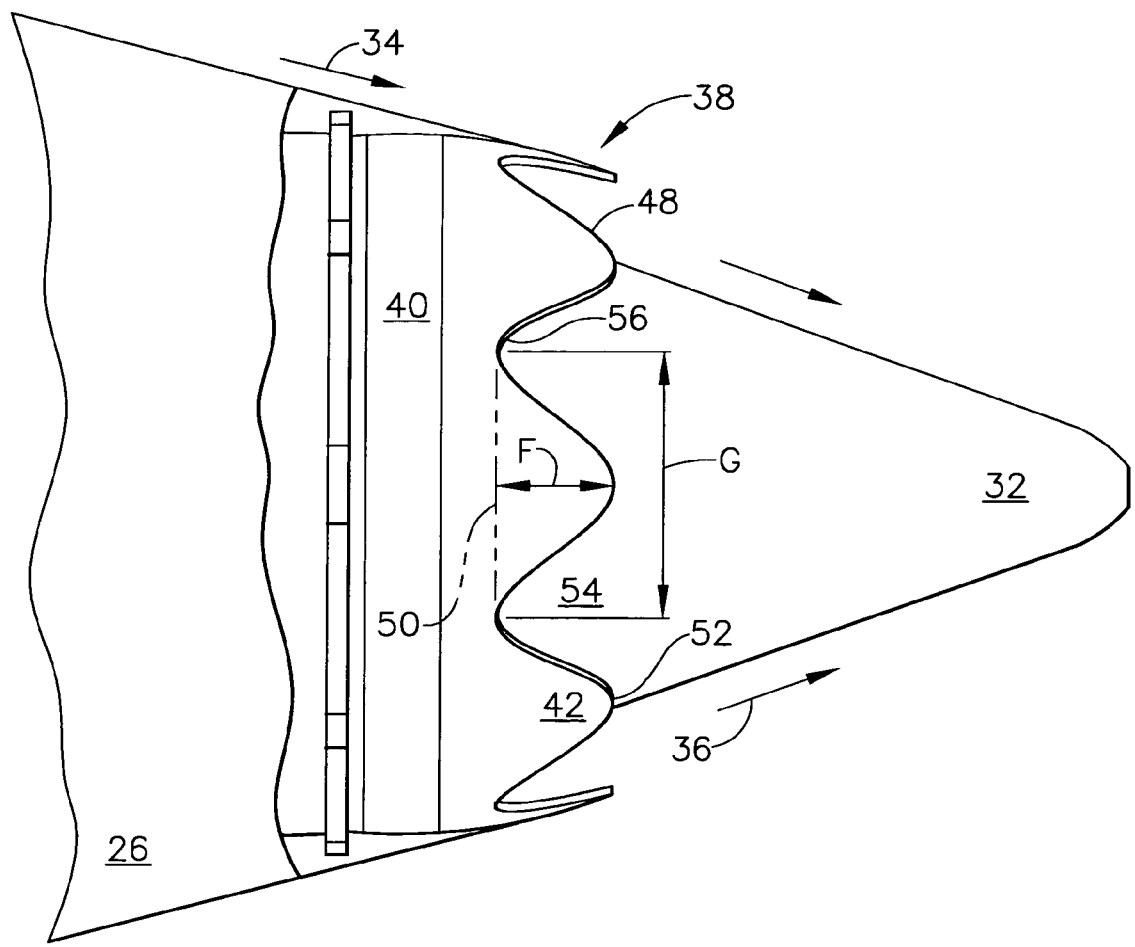
FIG. 3 is an axial, side elevational view of the core exhaust nozzle illustrated in FIG. 1, and shown in isolation.

As shown in more detail in FIG. 3, the core nozzle 38 includes an annular exhaust duct 40 having a plurality of circumferentially or laterally adjoining chevrons 42 arranged in a row and extending aft from the aft end of the exhaust duct, and integral therewith. The chevrons are circumferentially sinuous and define an outlet of the exhaust duct through which the exhaust gases 36 are discharged for mixing with the fan air exhaust 34 channeled downstream over the core cowl 26 during operation.

Figure 4:
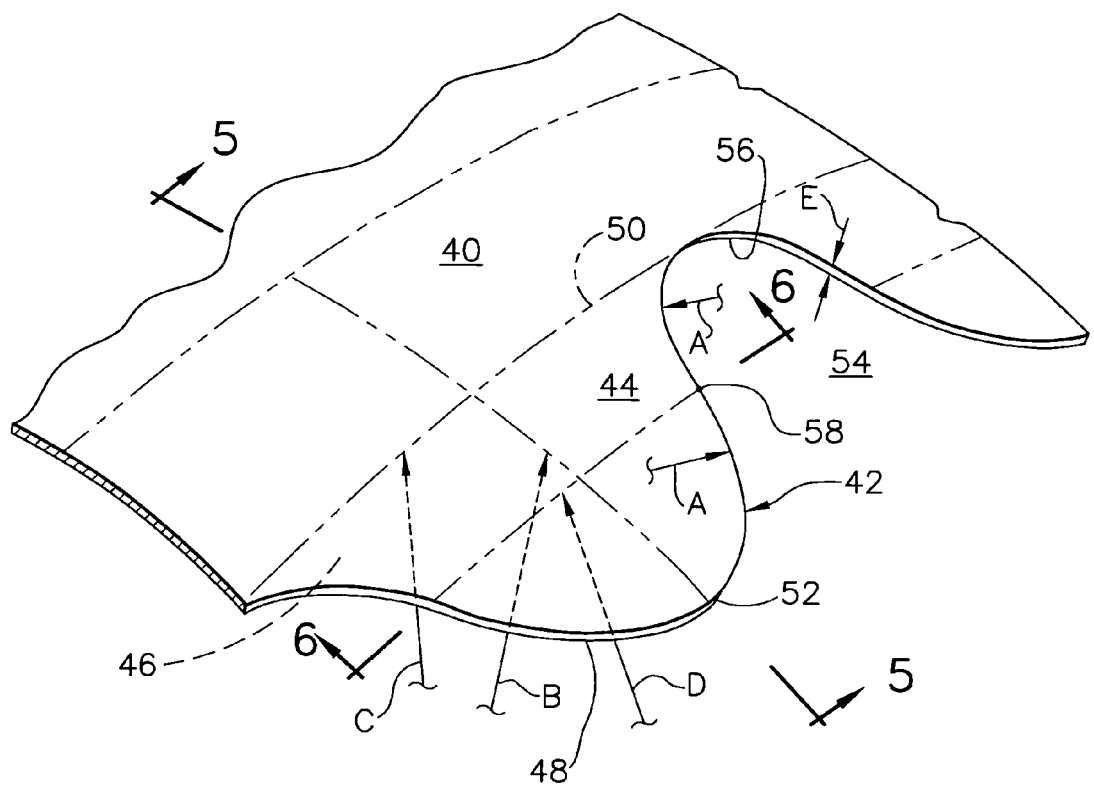
FIG. 4 is an isometric view of a portion of the core exhaust nozzle illustrated in FIG. 3.

One of the chevrons 42 is illustrated in more detail in FIG. 4 and forms an integral extension of the exhaust duct. Each of the chevrons has a generally triangular configuration or profile with radially outer and inner surfaces 44,46 bound or confined by a laterally sinuous trailing edge 48. The fan exhaust flows over the chevron outer surfaces during operation, while the core exhaust flows along the chevron inner surfaces during operation, with both flows meeting and mixing along the sinuous trailing edge of the chevron row.

Instead of having straight triangular sides as found in the original triangular chevrons disclosed in the above-identified patent, the sinuous chevrons 42 have side edges which introduce curvature in the plane of the individual chevrons themselves, as identified by the local radius of curvature A disposed perpendicular to the trailing edge. Each chevron extends from a circumferentially wide base 50 which axially adjoins the circular aft end of the exhaust duct 40, to an axially opposite aft apex 52.

Like the original triangular chevrons identified above, the sinuous chevrons 42 have compound arcuate contours both axially between the bases and apexes of the chevrons and circumferentially or laterally across the width of the chevrons. In FIG. 4, the axial contour of each chevron is represented by the radius of curvature B, and the lateral curvature of each chevron is represented by the radius of curvature C.

In this way, the compound contour of each chevron 42 may be further compounded by introducing additional curvature along the chevron trailing edge 48 itself, instead of having that trailing edge primarily straight in the manner of the original triangular chevrons.

As illustrated in FIGS. 3 and 4, the chevron 42 are spaced laterally apart around the circumference of the nozzle to define complementary, axially diverging sinuous slots 54 which are disposed in flow communication with the exhaust duct 40 itself. In this way, the core exhaust 36 discharged from the core duct 40 can flow radially outwardly through the sinuous slots 54 for mixing with the fan exhaust 34 flowing outside the chevrons.

Figure 5:
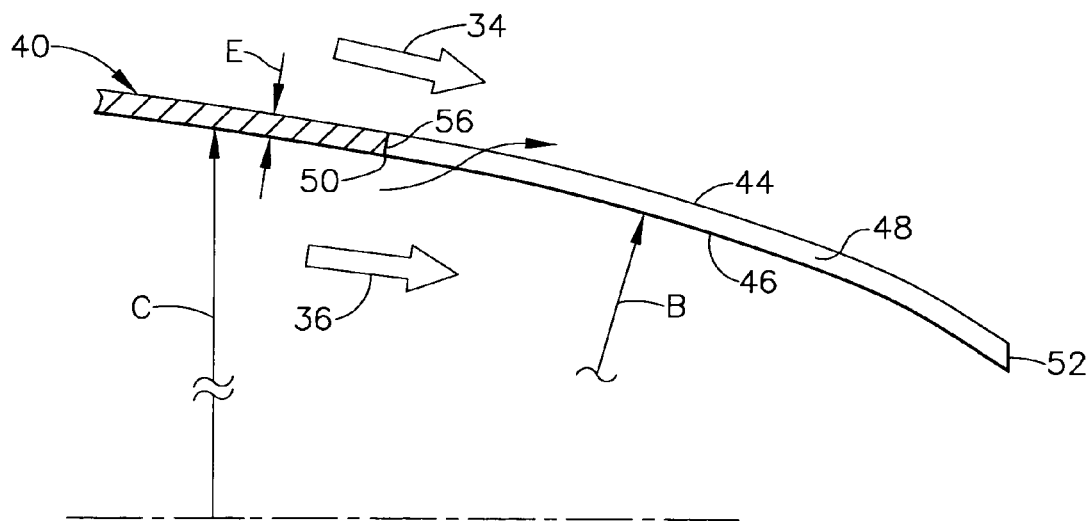
FIG. 5 is an axial sectional view through one of the chevrons in the exhaust nozzle illustrated in FIG. 4, and taken along line 5-5.

As illustrated in FIG. 5, the exhaust duct 40 has radially outer and inner surfaces which are circumferentially circular in the exemplary embodiment, and are defined by suitable values of the radius of curvature C whose origin is the axial centerline axis of the engine. The chevron outer and inner surface 44,46 are preferably coextensive with the respective outer and inner surfaces of the exhaust duct 40 from which they extend in a downstream aft direction.

Furthermore, the inner surfaces 46 of the chevrons at their bases 50 are laterally and radially coextensive with the duct inner surface to provide a continuous and smooth aerodynamic flowpath therewith for minimizing pressure losses. Similarly, the outer surfaces of the chevrons at their bases are laterally and radially coextensive with the outer surface of the exhaust duct for providing a continuous and smooth surface over which the fan exhaust is discharged during operation.

Furthermore, the row of chevron 42 and their intervening slots 54 are preferably generally laterally coextensive around the circumference thereof as illustrated in FIGS. 4 and 5 for minimizing the radially inward projection of the chevrons into the exhaust or exhaust duct outlet during operation. In this way, the chevrons have shallow contours with minimal radial disruption for minimizing pressure losses during operation, while correspondingly attenuating exhaust noise. The chevrons and their cooperating slots are specifically designed for enhancing the mixing of the high velocity core exhaust 36 with the lower velocity fan exhaust 34 which correspondingly reduces the noise generated therefrom during operation.

The sinuous chevron trailing edges 48 illustrated in FIG. 4 are preferably arcuate or curved laterally around or along both sides of the chevron apexes 52 for each chevron with corresponding symmetry. The trailing edges of adjacent chevrons join together in laterally arcuate fillets 56 extending circumferentially between adjacent chevrons. In this way, the row of chevrons are laterally contiguous at their bases with each other at the corresponding fillets 56 and with the circular perimeter of the exhaust duct 40 at the junction therewith.

As illustrated in FIG. 4, the chevron trailing edges 48 are preferably sinuous from the fillets 56 aft in the downstream direction toward the corresponding chevron apexes 52. And, the trailing edges 48 are also sinuous from the chevron apexes 52 forward in the upstream direction toward the corresponding fillets 56. In this way, the apexes and fillets themselves are suitably arcuate, and the trailing edge 48 continues the smooth arcuate profiles thereof along the opposite edges of each chevron between the bases and the apexes.

Since each chevron 42 is generally triangular and converges aft between the upstream base and the downstream apex, the sinuous apex 52 is laterally convex, whereas the sinuous fillet is laterally concave. The sinuous trailing edge of each chevron therefore preferably includes an inflection point 58, as illustrated in FIG. 4, disposed axially between the apexes 52 and the fillets 56 corresponding with the chevron bases 50 which permits the change in local curvature A along the side edges of the individual chevrons.

In the preferred embodiment illustrated in FIG. 4, the chevron trailing edges 48 are continuously sinuous from the fillets 56 to the apexes 52 and follow a sinusoidal curve around the circumference of the nozzle. Correspondingly, the intervening slots 54 are complementary sinusoidal from chevron to chevron around the circumferential extent of the nozzle.

The sinusoidal-form chevrons 42 illustrated in FIG. 4 were built and tested and compared with the original triangular form of the chevrons disclosed in the above-identified patent. Comparison of the two forms of chevrons in testing indicates that a substantial reduction in aerodynamic performance loss of the core nozzle may be obtained by using the sinusoidal chevrons over triangular chevrons for a given amount of noise attenuation. The introduction of the sinuous trailing edge in the chevrons cooperates with the compound contours thereof for improving the aerodynamic mixing performance of the chevrons while attenuating noise.

In the preferred embodiment illustrated in FIGS. 4 and 5, the chevron outer surface 44 is convex both axially and laterally, and the chevron inner surface 46 is concave both axially and laterally to define a shallow compound arcuate bowl therein.

Figure 2:
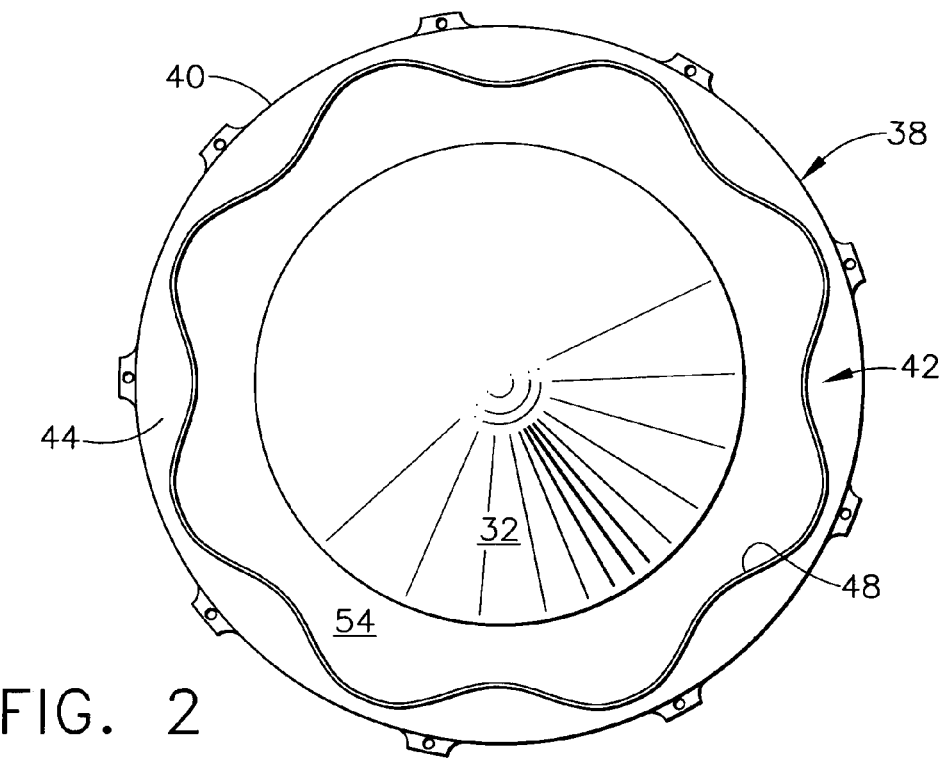
FIG. 2 is an aft-facing-forward view of the chevron core exhaust nozzle taken along line 2-2 in FIG. 1, and shown in isolation.
Figure 6:
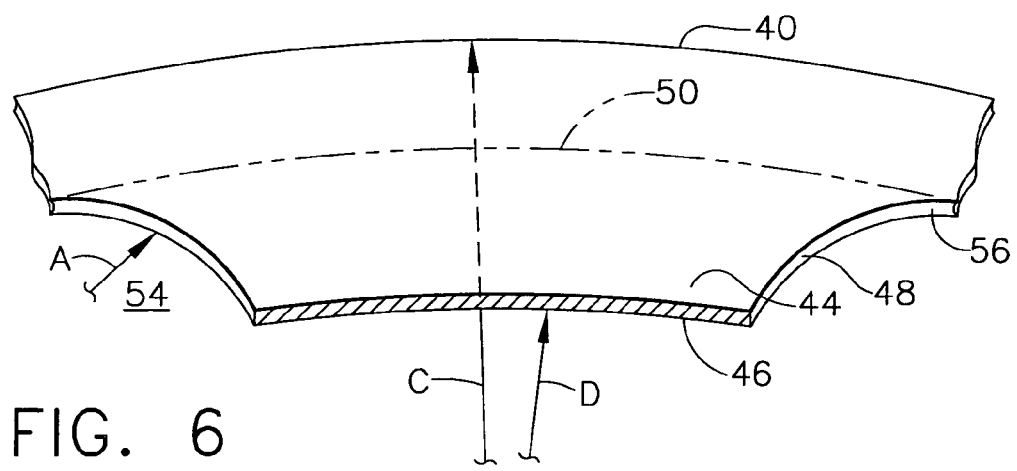
FIG. 6 is a partly sectional, aft-facing-forward view through one of the chevrons illustrated in FIG. 4, and taken along line 6-6.

As shown in FIGS. 2 and 6, the exhaust duct 40 is circular and has a corresponding value of the radius C from the engine centerline axis. And, the individual chevrons 42 are preferably non-circular around the circumference of the nozzle, with each chevron having a local radius of curvature D which varies along the circumferential extent of the chevron. In this way, the compound contour of the individual chevrons 42 as represented by the two radii of curvature B and D may be tailored or optimized for optimizing performance of the chevron independently from the circular contour of the exhaust duct 40 from which the chevrons extend.

The non-circular circumference (radius D) of the individual chevrons is a conventional feature found in one embodiment of the previous triangular chevron exhaust nozzle on sale in the United States for more than a year, and may be used to additional advantage in the improved sinuous chevron disclosed herein.

As shown in FIGS. 4 and 5, the individual chevrons 42 are laterally contiguous around the exhaust duct 40, and tangentially blend therewith, with the compound contour bowls terminating at the junction of the chevrons with the circular exhaust duct.

The chevrons 42 illustrated in FIGS. 4 and 5 preferably have a constant radial thickness E which matches the thickness of the exhaust duct from which they extend. The aft portion of the exhaust duct and the individual chevrons extending therefrom may be formed from a common ring of sheet metal having a common thin thickness thereof.

As shown in FIGS. 2 and 3, the upstream end of the exhaust duct 40 may have a suitable radial flange and mounting tabs for fixedly mounting the chevron nozzle into the core cowl 26. The outer surface of the core cowl blends smoothly with the outer surface of the chevron nozzle joined thereto as best shown in FIG. 3.

As also illustrated in FIG. 3, the chevrons 42 preferably have equal axial lengths F measured from their forward bases to their aft apexes. And, the chevron apexes 52 are preferably coplanar and aligned in a single axial plane along the centerline axis of the engine.

Each chevron illustrated in FIG. 3 has a circumferential width G which represents the period of a sine wave in the preferred embodiment. The width and period of the chevrons may be selected in accordance with the desired whole number thereof to be used around the circumference of the intended exhaust nozzle. In the embodiment illustrated in FIG. 2, there are eight whole chevrons 42 spaced equidistantly apart around the circumference of the exhaust nozzle in symmetry around the centerline axis of the engine.

In alternate embodiments, fewer or more chevrons may be used around the circumference of the nozzle, and some chevrons may be eliminated directly below the aircraft pylon which may interrupt the circumferential continuity of the external fan exhaust flow.

As shown in FIGS. 1-3, the sinuous chevrons 42 are introduced in the core exhaust nozzle 38 which includes the center plug 32 converging aft inside the exhaust duct 40. This external center plug 32 terminates aft or downstream from the chevron apexes 52 in a manner similar to the original triangular chevron configuration. Alternatively, a conventional internal center plug may be used with the sinuous chevrons.

Also like the previous triangular chevron nozzles, the sinuous chevrons 42 may be introduced into a corresponding fan exhaust nozzle 60 as illustrated in FIG. 1. The sinuous chevrons 42 in the fan nozzle embodiment may be substantially identical to those used in the core nozzle embodiment, except for different size and configuration specific to the larger fan exhaust nozzle in which they are incorporated. In either embodiment, the sinuous chevrons may now be additionally tailored or optimized for the introduction of smoothly curved trailing edges between the bases and apexes thereof, either completely or in most part as the particular design merits.

In yet another configuration, the fan nacelle may extend aft past the core nozzle to a common exhaust outlet, with a long fan bypass duct terminating upstream therefrom. The sinuous chevrons may be incorporated in the core nozzle as an internal mixer for mixing the core exhaust and the fan bypass air.

The introduction of smoothly changing contour along the trailing edges of the chevrons cooperates with the compound shallow contours thereof for introducing an additional design variable for decreasing chevron aerodynamic performance loss while attenuating exhaust noise.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine exhaust nozzle comprising a row of laterally curved sinuous chevrons extending from an aft end of an exhaust duct and spaced laterally apart to define complementary axially diverging sinuous slots, and each of said chevrons has a shallow compound contour bowl therein and is continuously sinuous axially along said slots.

2. A nozzle according to claim 1 wherein said chevrons are laterally contiguous around said duct, and tangentially blend therewith, with said bowls terminating thereat.

3. A nozzle according to claim 2 wherein:
each of said chevrons has radially outer and inner surfaces bound by a laterally sinuous trailing edge extending aft from a base of said chevron adjoining said duct to an axially opposite apex of said chevron; and
said chevrons have a compound arcuate contour defining said bowls both axially between said bases and apexes, and laterally across said chevrons.

4. A nozzle according to claim 3 wherein:
said duct includes a radially inner surface; and
said chevron inner surfaces at said bases are laterally and radially coextensive with said duct inner surface.

5. A nozzle according to claim 4 wherein said chevrons and slots are generally laterally coextensive for minimizing radially inward projection of said chevrons.

6. A nozzle according to claim 5 wherein said sinuous chevron trailing edges are arcuate around said chevron apexes, and joined together in arcuate fillets between adjacent chevrons.

7. A nozzle according to claim 6 wherein said chevron trailing edges continue said arcuate profile thereof between said arcuate fillets and said arcuate apexes.

8. A nozzle according to claim 7 wherein said chevron trailing edges are sinusoidal, and said slots are complementary sinusoidal.

9. A nozzle according to claim 8 wherein:
said chevron outer surface is convex;
said chevron inner surface is concave; and
said chevron apexes are coplanar.

10. A nozzle according to claim 9 wherein said chevrons have a constant thickness, and said chevron surface is coextensive with an outer surface of said duct.

11. A gas turbine engine exhaust nozzle comprising:
an exhaust duct including a plurality of laterally adjoining chevrons extending from an aft end thereof;

each of said chevrons having radially outer and inner surfaces bound by a laterally curved sinuous trailing edge extending between a base of said chevron adjoining said duct and an axially opposite apex of said chevron;

said chevron trailing edges are continuously sinuous from said bases to said apexes; and said chevrons having a compound arcuate contour both axially and laterally.

12. A nozzle according to claim 11 wherein said chevrons are spaced laterally apart to define complementary axially diverging sinuous slots disposed in flow communication with said duct for channeling exhaust radially therethrough.

13. A nozzle according to claim 12 wherein:

said duct includes a radially inner surface for bounding said exhaust; and said chevron inner surfaces at said bases are laterally and radially coextensive with said duct inner surface.

14. A nozzle according to claim 13 wherein said chevrons and slots are generally laterally coextensive for minimizing radial projection of said chevrons into said exhaust.

15. A nozzle according to claim 14 wherein said sinuous chevron trailing edges are arcuate around said chevron apexes, and joined together in arcuate fillets between adjacent chevrons.

16. A nozzle according to claim 15 wherein said chevron trailing edges are sinuous from said fillets aft toward said chevron apexes, and from said chevron apexes forward toward said fillets, and continue said arcuate profile thereof between said bases and apexes.

17. A nozzle according to claim 16 wherein said chevron trailing edges include an inflection point axially between said apexes and fillets.

18. A nozzle according to claim 16 wherein said chevron trailing edges follow a sinusoidal curve around a circumference of said nozzle.

19. A nozzle according to claim 16 wherein said chevron trailing edges are sinusoidal, and said slots are complementary sinusoidal.

20. A nozzle according to claim 16 wherein said chevron outer surface is convex, said chevron inner surface is concave and defines a compound bowl.

21. A nozzle according to claim 16 wherein said exhaust duct is circular, and said chevrons are non-circular.

22. A nozzle according to claim 16 wherein said chevrons have a constant thickness.

23. A nozzle according to claim 16 wherein said chevrons have equal lengths from said bases to said apexes.

24. A nozzle according to claim 23 wherein said chevron apexes are coplanar.

25. A nozzle according to claim 16 wherein said chevron outer surface is coextensive with an outer surface of said duct.

26. A nozzle according to claim 16 wherein said exhaust duct comprises a core engine nozzle including a center plug converging aft therein and terminating aft of said chevron apexes.

* * * * *